Figure 1:
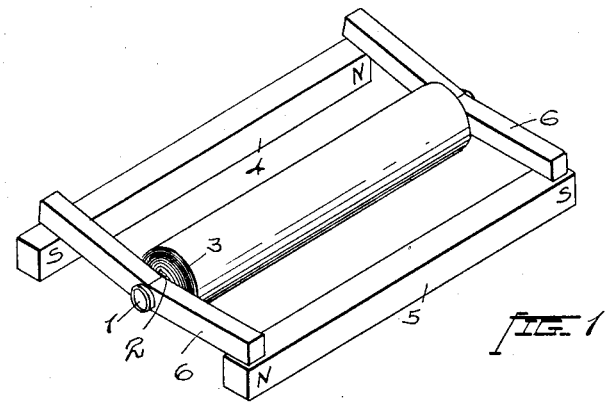

A. B. HERRICK.
INDUCTOR.
APPLICATION FILED NOV. 29, 1912.

1,164,611.

Patented Dec. 14, 1915.
3 SHEETS—SHEET 1.

WITNESSES =
Oliver M. Kappler
Horace B. Jay

INVENTOR
Albert B. Herrick
BY Jay and Oberlin
ATTORNEYS

A. B. HERRICK.
INDUCTOR.
APPLICATION FILED NOV. 29, 1912.
1,164,611.
Patented Dec. 14, 1915.
3 SHEETS—SHEET 2.
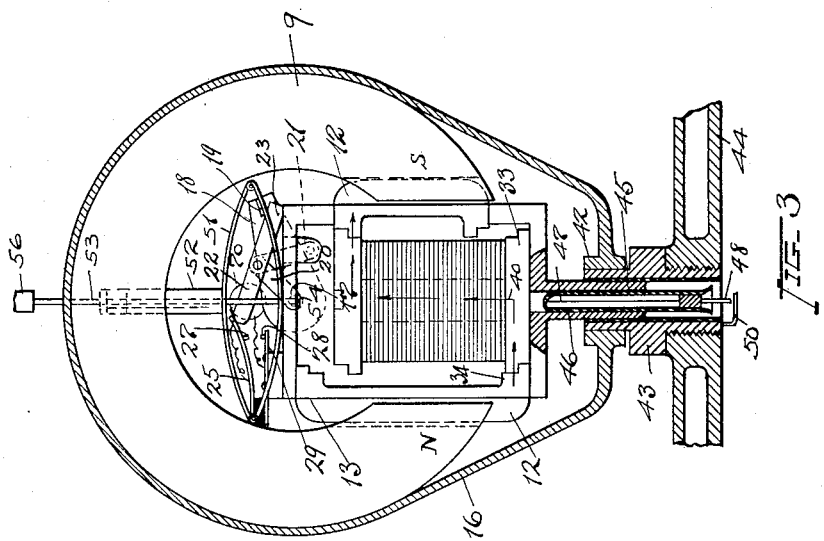
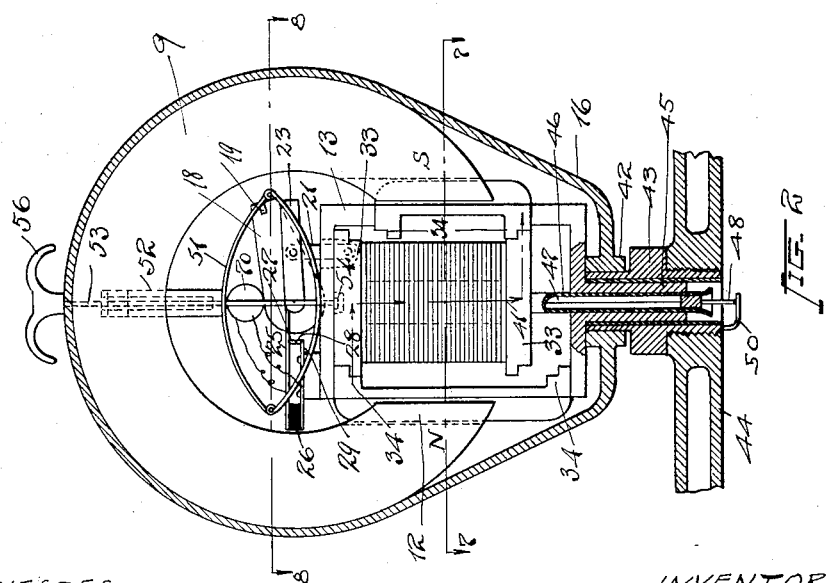
WITNESSES:
Oliver M. Kappler
Horace B. Fay
INVENTOR
Albert B. Herrick
BY Fay and Oberlin
ATTORNEYS A. B. HERRICK.
INDUCTOR.
APPLICATION FILED NOV. 29, 1912.
1,164,611.
Patented Dec. 14, 1915.
3 SHEETS—SHEET 3.
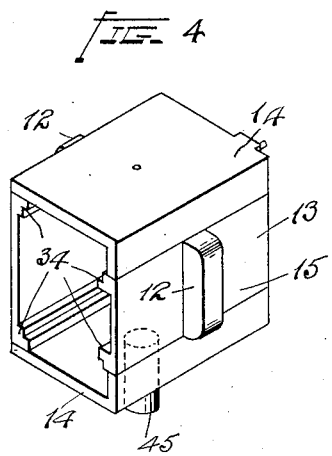
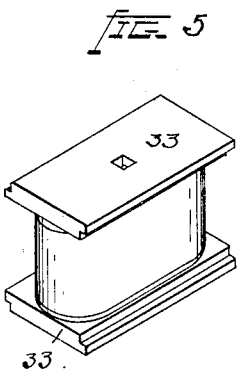
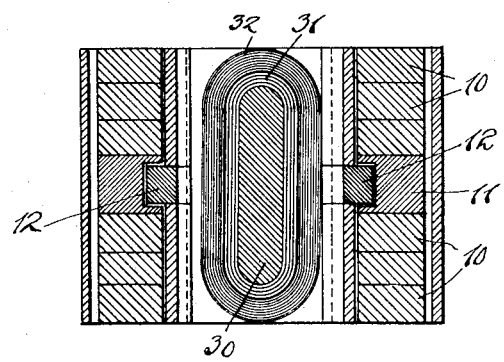
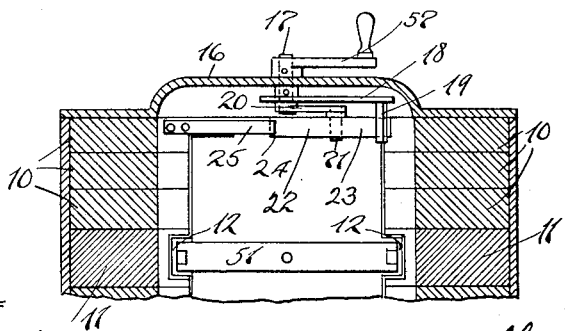

UNITED STATES PATENT OFFICE.

ALBERT B. HERRICK, OF NEW YORK, N. Y., ASSIGNOR TO MATIE C. MESSLER, OF PAWTUCKET, RHODE ISLAND.

INDUCTOR.

1,164,611.  Specification of Letters Patent.  Patented Dec. 14, 1915.

Original application filed May 31, 1912, Serial No. 700,594. Divided and this application filed November 29, 1912. Serial No. 733,977.

*To all whom it may concern:*

Be it known that I, ALBERT B. HERRICK, a citizen of the United States, and a resident of New York city, county of New York and State of New York, have invented a new and useful Improvement in Inductors, of which the following is a specification, the principle of the invention being herein explained and the best mode in which I have contemplated applying that principle, so as to distinguish it from other inventions.

The present invention relates to a new and improved method for inducing a current in a coil. The current is induced in an induction coil which, while in construction similar to that now used for the same purpose, is totally different in operation. The present induction coil comprises an iron core surrounded by primary and secondary windings. It differs from the usual armature by being fixed and immovable. A magnet is disposed adjacent to the coil and the current is induced by varying the disposition of the magnetic circuit both in direction and intensity. Mechanical means are provided for thus shifting the magnetic circuit, and such action may be produced by either rotary or reciprocating motion of a single member.

The present application relates to the inductor described in my copending application, Serial No. 700,594, filed May 31, 1912, from which the present application has been divided.

In order to more clearly bring out the operation of apparatus for inducing a current by my new method, I show the same in connection with a spark plug adapted to be inserted in the compression chamber of an internal combustion or explosive engine. This mechanism also serves to illustrate a second form which the mechanical shifting means may assume without in any way departing from the invention. In such a device the operating member, or means for shifting the magnetic circuit, will preferably be operated by the compression in the chamber, both for simplicity of construction and for the purpose of having the movement of such member responsive to and following the movement of the piston in the compression chamber.

The induction coil may be designed for either high or low tension current, and the system will be provided with means for handling either type. That is, if high tension is used, then means must be provided to break the circuit externally of the cylinder, assuming the invention applied to ignition mechanism, while with a low tension the current will be broken in the cylinder. High tension is at present so universally used on small engines that I have here shown only mechanism adapted to such a system, as that will be my preferred type of ignition. It will be obvious, however, that only slight mechanical changes will be necessary to adapt the mechanism to a low tension system.

The annexed drawings and the following description set forth in detail certain mechanism embodying the invention, such disclosed means constituting, however, but one of the various mechanical forms in which the principle of the invention may be used.

Figure 6:
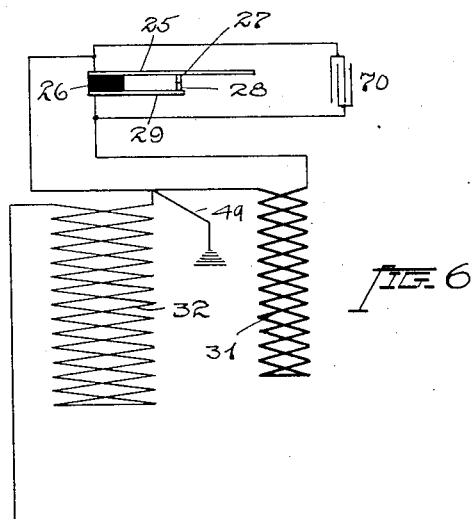

In said annexed drawings: Figure 1 is a view in perspective of a coil and magnet illustrating the construction of my device in its general form; Fig. 2 is an end elevation of my device applied to an igniter illustrating a modified form of the shifting means; Fig. 3 is a view similar to Fig. 2, but showing the movable member of the igniter in its raised position; Figs. 4 and 5 are views in perspective of the movable member and the induction coil to be used in the igniter; Fig. 6 is a diagrammatic view showing the connections in my device; Fig. 7 is a sectional view on the line 7—7 in Fig. 2; and Fig. 8 is a section on the line 8—8 showing the construction of the springs and the contact points on top of the movable member of my igniter.

In Fig. 1 I show a soft core 1, about which there is wound a primary coil 2 and a secondary coil 3. On either side of this core are disposed permanent magnets 4 and 5, and on either end of the core 1 there are mounted arms 6 which are adapted, upon partial rotation, to connect up the core with either one of these magnets. In this way the direction of the magnetic current may be reversed by changing these arms from their connection from one of the magnets to the other. There is no necessity for rotating the coil and core to change the direction of the magnetic flux as this may be done by merely rotating these arms, or by moving a suitable connecting member, such as a keeper, which is shown in the application of my device to ignition mechanism. Thus it will be seen that the device may be operated either by an oscillating member or by a reciprocating member, depending upon the specific arrangement of the coil and magnet. In either case the magnetic circuit through the core induces a current in the primary and secondary coils, which will vary in direction and intensity according to the disposition of the magnetic circuit.

In Fig. 2, which shows the invention adapted to an igniter, there is shown a laminated permanent magnet 9 which is formed of six separate iron strips 10 having a brass strip 11 between each set of three iron strips. The magnet is of horseshoe form, as shown, and at the two ends the brass strip is cut away or slotted, adapting it to receive the brass strips 12 to which are attached a keeper 13. The latter is formed of two spaced horizontal brass strips 14 and two side iron strips 15 attached to the brass strips, these last-named strips sliding in the slots in the magnet. This keeper forms the connecting or movable member, referred to in the preceding paragraphs, for the purpose of shifting the magnetic circuit through the induction coil. Around the magnet there is placed an aluminum casing 16, and in this casing there is mounted a horizontal shaft 17 bearing fixedly thereon an arm 18 which carries a stop 19. Loosely mounted on this shaft is a lever 20 which is attached by means of a link 21 to the keeper. At one end of the lever 20 is mounted a stub shaft 71 and rotatably carried on such shaft is a second lever 22 having one end 23 adapted to engage the stop 19 upon being rotated about the shaft 21. The other end of such lever is formed into a latch 24 and is engaged by the spring 25 which is mounted on the block 26 and bears a platinum contact point 27 adapted to normally engage a similar contact point 28 on the member 29, also mounted on said block 26. The engagement of these two points closes the primary circuit, as will be seen in Fig. 6.

The induction coil comprises a core 30 (see Figs. 5 and 7), a primary coil 31 and a high tension secondary coil 32. At either end of the core is mounted a contact plate 33 having stepped edges as shown.

The induction coil is placed within the keeper 13 and is fixed by attaching it to the back of the outer aluminum casing. The keeper 13 is hollow, as shown, and on its inside has steps 34 adapted to engage the steps on the core. It will be noticed that the steps on the keeper are disposed so that in either upper or lower position of the latter there will be a contact between the same and the core although the circuit will be different in such two positions. In the upper position of the keeper the disposition of the magnetic circuit is indicated by the arrows 40, in the lower position of the keeper the magnetic circuit is indicated by the arrows 41.

The casing 16 terminates in a collar 42 engaging the casing 43 of a spark plug which is adapted to engage an engine cylinder 44 (see Figs. 2 and 3). The spark plug casing is apertured at its lower end and contains a piston member 45 slidable in such aperture. Such piston is extended to permit of attachment to the keeper and will be operated by the compression in the engine cylinder, as will be readily understood. In this way the action of the keeper can be made to follow the movement of the engine piston.

Attached to the coil is a tube 46 which passes through the piston and forms a guide for the same. This tube incloses the lead wire 47 from the secondary coil to the spark plug terminal 48. The other wire 49 from the secondary coil is grounded on the engine cylinder and the connection to the other terminal 50 is through this ground. The piston and tube are insulated from the plug casing by suitable packing in the usual manner.

In order to return the keeper to its lower position I employ an elliptic spring 51 which rests on the top of the keeper. In the top of the brass strip in the magnet is a threaded aperture engaged by a brass tube 52 which bears on the top of the elliptic spring. The tube 52 has a square aperture therein engaged by a rod 53 extending through an aperture in the top of the keeper and having a stop 54 on its lower end adapted to engage the keeper when such rod is lifted, thereby raising the keeper. On the top of the rod is a handle 56. By rotating this handle the tube is rotated thus moving it vertically and increasing or decreasing the tension on the spring 51, as desired. In this way the movement of the keeper may be to some extent controlled and the device adapted to compression of the engine to which it is attached.

In operation the igniter may be set to give a spark at any desired point in the cycle by controlling the movement of the keeper through the spring 51 and by setting the stop 19, by rotating the arm 18 by means of the crank 57 which projects beyond the casing. As the engine piston compresses the gas the piston in the spark plug is forced upward, such movement beginning only when the pressure in the cylinder is greater than the pressure of the spring 51, and the pull of the magnets. The keeper is thus raised to its upper position, thus raising lever 20 which rotates about the shaft 17. Such movement causes upward movement of the lever 22, the end 24 being held fixed by the spring 25. When the end 23 strikes the stop 19, the lever 22 will pivot about this point, thus raising the spring 25 and separating the contact points 27 and 28. This breaks the circuit and permits the current which has been induced to flow to the terminals of the spark plug and fire the compressed gas. This is the mechanical operation of the device. The electrical operation is more clearly shown by starting with the action when the keeper is beginning its downward movement. As the keeper moves downward a current is induced in the coils. The circuit is closed at this time, however, as shown in Fig. 6. As the keeper reaches the lower position and is moved upward the magnetic circuit is shifted and the direction of the lines of force in the coil is changed. As the upward movement of the keeper continues, a current is again built up in the coils and upon the breaking of the contact points 27 and 28, a strong spark is obtained across the spark plug terminals.

The wiring connections are readily seen from Fig. 6 and need no further explanation.

A condenser 70 of the usual type is shown connected across the primary coil.

The advantages of my apparatus are its extreme simplicity, few moving parts and efficient action. The spark obtained is strong and the operation is simple. The features of the invention to which I call particular attention are the general apparatus for inducing a current in a coil by my new method, the specific construction of the apparatus and the mechanical shifting means. Regarding the latter feature it will be noted that no particular movement of the means is essential, as I show two movements either of which insures perfect operation. The actuating mechanism for the shifting means are of no importance in this connection as they depend wholly upon the use to which the invention is put.

The advantage of the present inductor over those at present in use lies in the fact that the direction of the magnetic flux through the core may be reversed by purely mechanical means. In previous forms the core of the induction coil was magnetized and demagnetized by means of a battery connected to the ends of a primary coil, this circuit being broken and closed repeatedly. The core is thus magnetized and demagnetized by electrical means. In the case of a transformer which is essentially an induction coil, the core is magnetized and demagnetized by the successive fluctuations of an alternating current which is passed through a primary winding around the core. The direction of the flux is reversed with great rapidity but the means for thus reversing it is the reversal of this alternating current. In other words, the ordinary forms are electro-magnetic and not mechanically magnetic. The origin of the magnetic lines in the ordinary forms are produced by a source of electrical energy. This invention discloses a shifting, by mechanical means, of magnetic lines permanently residing adjacent to the induction system.

By providing mechanical means for reversing the flux through the core of the inductor, the field of usefulness of inductors is greatly increased, as they can now be used where electrical means for reversing the flux are either not available or not practicable.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

1. The combination of an induction coil including a core with fixed windings for the same; a magnet disposed adjacent said core; an armature member reciprocably mounted between the ends of said magnet, a plurality of spaced contacts on said member, certain of said contacts being adapted in one position of said member to engage the ends of said core, thereby connecting said core and said magnet in closed magnetic circuit, the other of said contacts being adapted to connect said core and said magnet in closed magnetic circuit when said member is reciprocated, such newly formed circuit being so formed that the direction of the magnetic flux through said core is reversed.

2. The combination of an induction coil including a core with fixed windings for the same; a magnet disposed adjacent said core; contacts mounted on either side of each end of said core; an armature member reciprocably mounted between the poles of said magnet and in magnetic circuit therewith; spaced contacts mounted on the said armature, said contacts being adapted to engage different contacts on said core in different positions of said armature, thereby reversing the direction of the magnetic flux through the core upon reciprocation of said armature.

3. The combination of an induction coil including a core with fixed windings for the same; a magnet disposed adjacent said core; contacts mounted on either side of each end of said core; a hollow keeper reciprocably mounted between the poles of said magnet, either side of said keeper being in magnetic circuit with one of said poles, the sides of said keeper being magnetically insulated from each other; two spaced contacts mounted on each side of said keeper, the contacts on such sides being at unequal distances from the ends of the same; said keeper surrounding said coil and adapted to reciprocate parallel to said core; said contacts on said keeper and core being so disposed relatively to each other that in one position of said keeper, the magnetic flux is passed through said core in one direction, and upon reciprocation of said keeper, the magnetic flux is passed through said core in the reverse direction.

Signed by me, this 21" day of November, 1912.

ALBERT B. HERRICK.

Attested:
D. T. DAVIES,
HORACE B. FAY.